United States Patent
Kim et al.

(10) Patent No.: US 12,449,927 B2
(45) Date of Patent: Oct. 21, 2025

(54) DISPLAY DEVICE

(71) Applicant: Samsung Display Co., LTD., Yongin-si (KR)

(72) Inventors: Hun Tae Kim, Yongin-si (KR); Kyung Hoon Kim, Yongin-si (KR); Cheol Yeong Park, Yongin-si (KR); Dong Hun Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/924,075

(22) Filed: Oct. 23, 2024

(65) Prior Publication Data

US 2025/0216970 A1    Jul. 3, 2025

(30) Foreign Application Priority Data

Dec. 29, 2023 (KR) .................. 10-2023-0196286

(51) Int. Cl.
*G06F 3/041* (2006.01)
*H04M 1/02* (2006.01)
*H10K 59/40* (2023.01)

(52) U.S. Cl.
CPC ...... *G06F 3/04162* (2019.05); *H04M 1/0268* (2013.01); *H04M 1/0277* (2013.01); *G06F 2203/04102* (2013.01); *H10K 59/40* (2023.02)

(58) Field of Classification Search
CPC . G06F 2203/04102; G06F 2203/04103; G06F 2203/04107; G06F 2203/04112; G06F 3/0412; G06F 3/04164; G06F 3/0443; G06F 3/0446
See application file for complete search history.

(56) References Cited

U.S. PATENT DOCUMENTS

| | | |
|---|---|---|
| 10,966,315 B2 | 3/2021 | Uogishi et al. |
| 2018/0090696 A1 | 3/2018 | Jang et al. |
| 2021/0409527 A1* | 12/2021 | Li ................ G06F 1/1686 |
| 2022/0197440 A1 | 6/2022 | Son et al. |
| 2022/0320233 A1* | 10/2022 | Wang .............. H04M 1/0266 |
| 2023/0400888 A1 | 12/2023 | Park et al. |

* cited by examiner

*Primary Examiner* — Insa Sadio
(74) *Attorney, Agent, or Firm* — CANTOR COLBURN LLP

(57) ABSTRACT

A display device includes a display panel including a display area and a non-display area around the display area, where the display panel includes a display surface on which an image from the display area is displayed, and a rear surface opposite to the display surface, and a circuit board connected to the display panel. The display panel further includes a first portion extending from the non-display area and bent, and a second portion extending from the first portion in a first direction to face the rear surface of the display panel, protruding from the first portion in the first direction, and connected to the circuit board, the first portion of the display panel has a first width in a second direction crossing the first direction, and the second portion of the display panel has a second width less than the first width in the second direction.

17 Claims, 12 Drawing Sheets

DISPLAY DEVICE

This application claims priority to Korean Patent Application No. 10-2023-0196286, filed on Dec. 29, 2023, and all the benefits accruing therefrom under 35 U.S.C. § 119, the content of which in its entirety is herein incorporated by reference.

BACKGROUND

1. Field

The disclosure relates to a display device.

2. Description of the Related Art

Generally, an electronic device is implemented as a multimedia device (multimedia player) with various functions such as image display, capturing a photograph or a moving image, playing a music or a moving image, a game, and reception of a broadcast. Due to development of such a multimedia device, importance of a display device is increasing.

Various types of display devices such as an organic light emitting display (OLED) device and a liquid crystal display (LCD) device are used in various fields. Such a display device may include a display panel and a circuit board connected to the display panel.

SUMMARY

Recently, the display device is being developed in various forms. For example, various flexible display devices that may be transformed into a curve shape, folded, or rolled are being developed. As at least a portion of such a flexible display device is bent, a space where a circuit board and a part may be disposed may be insufficient.

Embodiments provide a display device in which a space is efficiently provided in a circuit board.

According to an embodiment of the disclosure, a display device includes a display panel including a display area and a non-display area around the display area, where the display panel includes a display surface on which an image from the display area is displayed, and a rear surface opposite to the display surface, and a circuit board connected to the display panel. In such an embodiment, the display panel further includes a first portion extending from the non-display area and bent, and a second portion extending from the first portion in a first direction to face the rear surface of the display panel, protruding from the first portion in the first direction, and connected to the circuit board. In such an embodiment, the first portion of the display panel has a first width in a second direction crossing the first direction, and the second portion of the display panel has a second width less than the first width in the second direction.

In an embodiment, the display surface may have a third width greater than the first width in the second direction.

In an embodiment, the circuit board may be fixed to the second portion of the display panel.

In an embodiment, the circuit board may be a flexible circuit board.

In an embodiment, the display device may further include a driver integrated circuit disposed on the second portion of the display panel and electrically connected to the display panel through lines of the display panel.

In an embodiment, the circuit board may include a first area disposed adjacent to the second portion of the display panel in the second direction or a direction opposite to the second direction.

In an embodiment, the first portion of the display panel may have a first edge adjacent to the first area and extending in the second direction, and the second portion of the display panel may have a second edge adjacent to the first area and extending in the first direction.

In an embodiment, the first area may be adjacent to the first and second edges.

In an embodiment, the display device may further include a driver integrated circuit disposed on the second portion of the display panel, where the driver integrated circuit controls the display panel, and circuit elements disposed on the first area of the circuit board and electrically connected to the driver integrated circuit.

In an embodiment, the display device may further include a touch array disposed on the display panel, a driver integrated circuit disposed on the second portion of the display panel, where the driver integrated circuit controls the display panel, and a touch driving circuit disposed on the first area of the circuit board, where the touch driving circuit controls the touch array.

In an embodiment, the display panel may include a substrate, a pixel circuit layer disposed on the substrate, where the pixel circuit layer includes a transistor, a display element layer including a light emitting element electrically connected to the transistor, and a thin film encapsulation layer disposed on the display element layer, and the touch array may be disposed on the thin film encapsulation layer.

In an embodiment, the circuit board may further include a second area disposed adjacent to the second portion of the display panel in the first direction.

In an embodiment, an area of the first area may be less than an area of the second area.

In an embodiment, the display device may further include a driver integrated circuit disposed on the second portion of the display panel, where the driver integrated circuit controls the display panel, and circuit elements disposed on the first area of the circuit board and electrically connected to the driver integrated circuit, and at least one selected from a battery, a sensor module, an antenna module, and a sound output module may be disposed on the second area of the circuit board.

In an embodiment, the display device may further include a touch array disposed on the display panel, a driver integrated circuit disposed on the second portion of the display panel, where the driver integrated circuit controls the display panel, and a touch driving circuit disposed on the first area of the circuit board, where the touch driving circuit controls the touch array, and at least one selected from a battery, a sensor module, an antenna module, and a sound output module is disposed on the second area of the circuit board.

In an embodiment, the display area and the non-display area may include a first unfoldable area, a foldable area, and a second unfoldable area sequentially disposed in a direction opposite to the first direction, and the foldable area may be foldable based on a folding axis extending along the second direction.

In an embodiment, the first portion of the display panel may extend from an area adjacent to the second unfoldable area of the non-display area of the display panel, and the circuit board may overlap the second unfoldable area.

BRIEF DESCRIPTION OF THE DRAWINGS

The above and other features of embodiments of the disclosure will become more apparent by describing in further detail embodiments thereof with reference to the accompanying drawings, in which.

DETAILED DESCRIPTION

Figure 1:
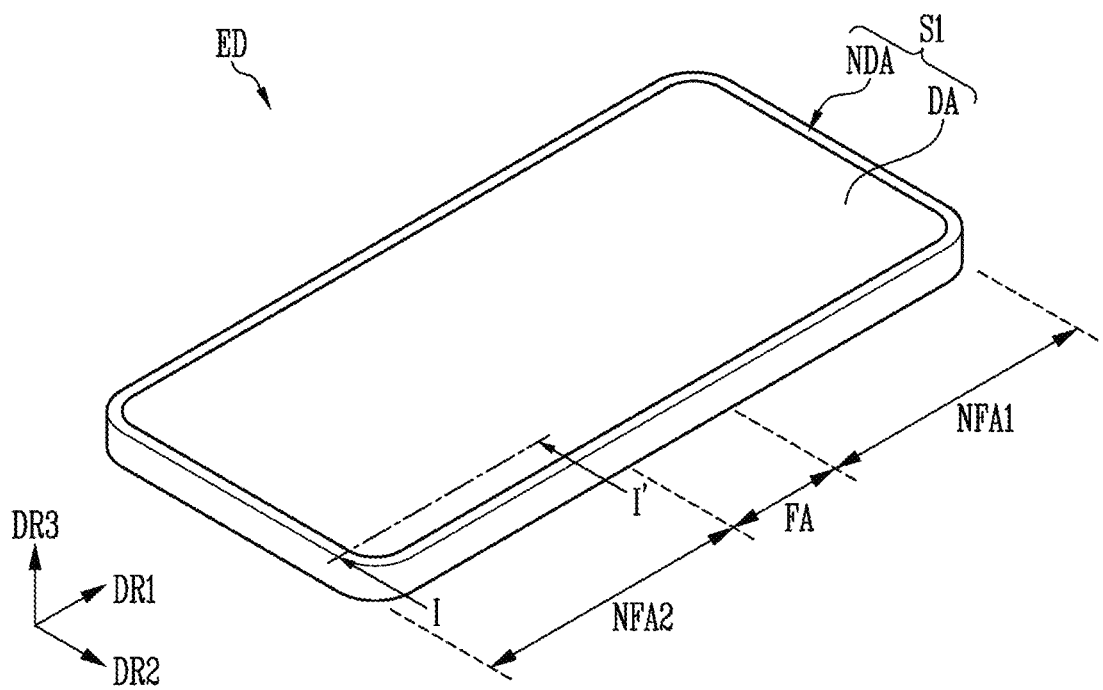
FIG. 1 is a perspective view illustrating an electronic device including a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

Throughout the specification, in a case where a portion is "connected" to another portion, the case includes not only a case where the portion is "directly connected" but also a case where the portion is "indirectly connected" with another element interposed therebetween.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a perspective view illustrating an electronic device including a display device according to an embodiment of the disclosure.

Figure 3:
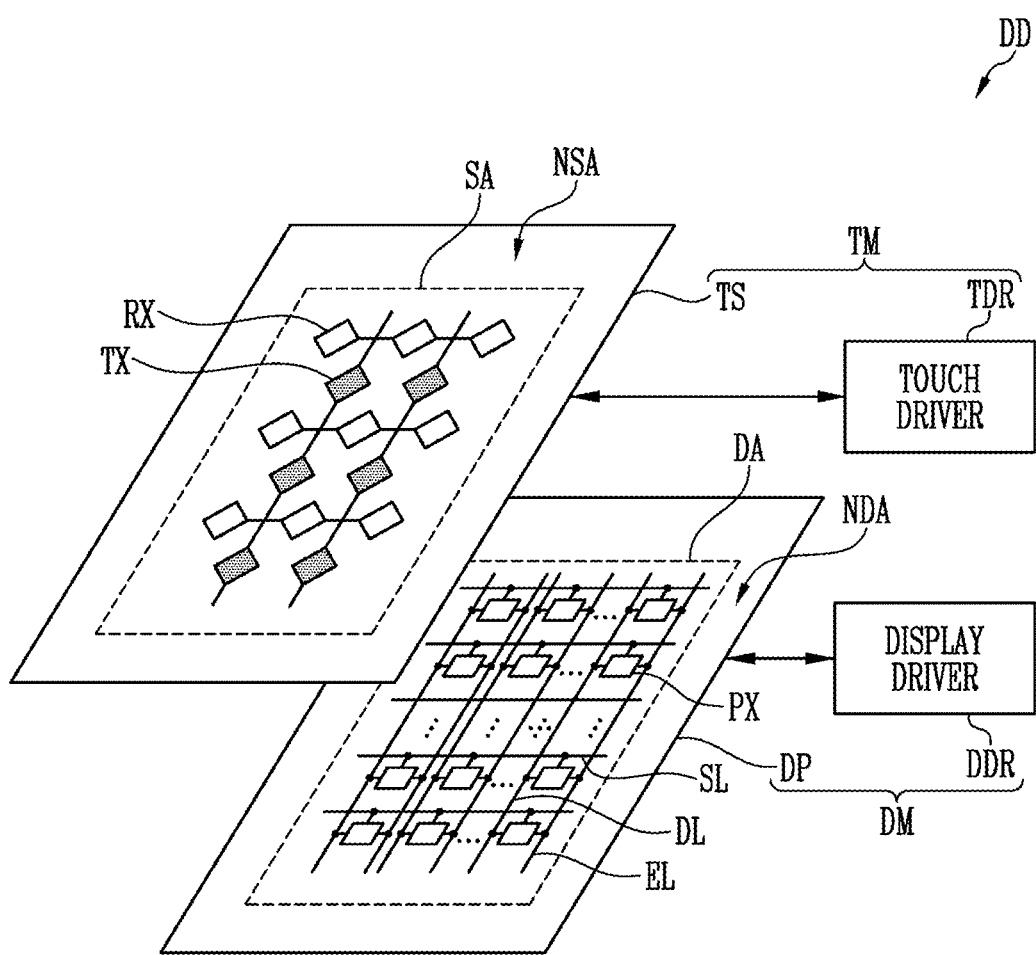
FIG. 3 is a block diagram illustrating an embodiment of the display device included in the electronic device of FIG. 1.

Referring to FIG. 1, an embodiment of the electronic device ED may include a display device DD (refer to FIG. 3).

In the disclosure, the electronic device ED may be any electronic device including a display surface defined on at least one surface thereof, such as a smartphone, a television, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, or a wearable.

The electronic device ED may be provided in various shapes, for example, a rectangular plate shape having two pairs of sides parallel to each other, but the disclosure is not limited thereto. In an embodiment where the electronic device ED is provided in the rectangular plate shape, one pair of sides of the two pairs of sides may be provided longer than the other pair of sides. According to an embodiment, the electronic device ED provided in the rectangular plate shape may have a round shape at a corner portion where one long side and one short side contact each other. However, the disclosure is not limited thereto.

In an embodiment of the disclosure, for convenience of description, an embodiment where electronic device ED has a rectangular shape having a pair of long sides and a pair of short sides is described, and an extension direction of the long side is indicated as a first direction DR1, an extension direction of the short side is indicated as a second direction DR2, and a thickness direction of the display device DD (or a substrate SUB shown in FIG. 6) is indicated as a third direction DR3.

In an embodiment, the electronic device ED may be a foldable electronic device. In an embodiment, at least a portion of the electronic device ED may be flexible, and the flexible portion may be foldable. In such an embodiment, an upper surface of the electronic device ED may be defined as a first surface S1 that displays an image, and in an unfolded state, in other words, in a state in which the electronic device is flat, the first surface S1 may have a plane defined by the first direction DR1 and the second direction DR2.

The electronic device ED may include a first unfoldable (i.e., non-foldable or flat) area NFA1, a foldable area FA, and a second unfoldable area NFA2 sequentially defined (or arranged) in the first direction DR1 or a direction opposite to the first direction DR1. In an embodiment, for example, the foldable area FA may be disposed between the first unfoldable area NFA1 and the second unfoldable area NFA2. However, the disclosure is not limited thereto. In an embodiment, for example, the electronic device ED may include more than two unfoldable areas, and foldable areas disposed between the unfoldable areas.

The electronic device ED may include a display area DA that displays an image and a non-display area NDA provided on at least one side of the display area DA. The non-display area NDA is an area where an image is not displayed. However, the disclosure is not limited thereto. According to an embodiment, a shape of the display area DA and a shape of the non-display area NDA may be variously designed.

Figure 2:
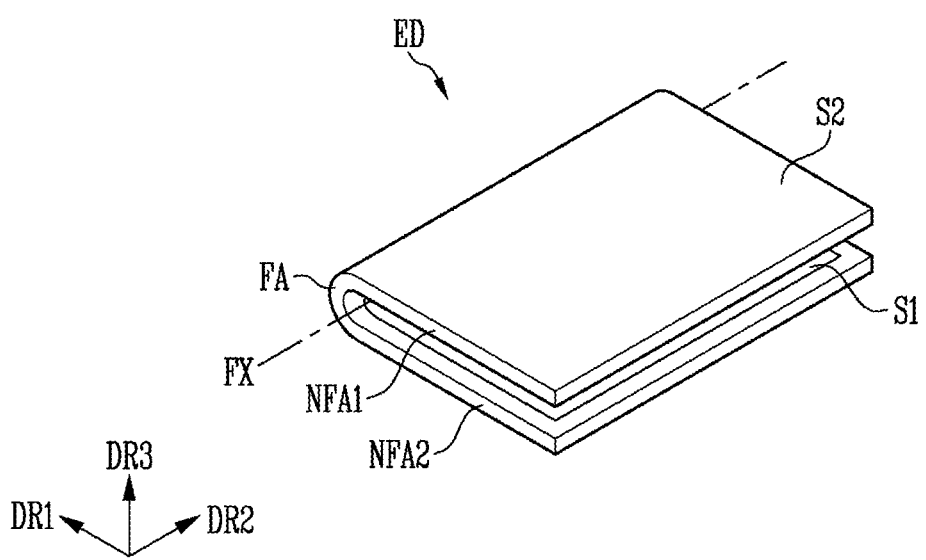
FIG. 2 is a perspective view illustrating the electronic device of FIG. 1 in a folded state.

FIG. 2 is a perspective view illustrating the electronic device of FIG. 1 in a folded state.

Referring to FIG. 2, an embodiment of the electronic device ED may be folded based on a folding axis FX. The foldable area FA may be bent based on the folding axis FX. In embodiments, the folding axis FX may be defined as a minor axis parallel to the short side of the electronic device ED. In another embodiment, for example, the folding axis FX may extend along the first direction DR1.

In an embodiment, the electronic device ED may be folded inwardly based on the folding axis FX. In such an embodiment, when the electronic device ED is folded, the first surface S1 of the first unfoldable area NFA1 and the first surface S1 of the second unfoldable area NFA2 may face each other. However, the disclosure is not limited thereto. In another embodiment, for example, the electronic device ED may be folded outwardly based on the folding axis FX. In such an embodiment, when the electronic device ED is folded, the second surface S2 of the first unfoldable area NFA1 and the second surface S2 of the second unfoldable area NFA2 may face each other.

In an embodiment, as shown in FIG. 2, the electronic device ED is folded along the minor axis, but the electronic device ED may be folded based on a folding axis aligned along one of various directions. In another embodiment, for example, the electronic device ED may be folded based on a major axis.

FIG. 3 is a block diagram illustrating an embodiment of the display device included in the electronic device of FIG. 1.

Referring to FIG. 3, an embodiment of the display device DD may include a touch module TM and a display module DM.

The touch module TM may include a touch array TS and a touch driver TDR for driving the touch array TS. The display module DM may include a display panel DP and a display driver DDR for driving the display panel DP.

In embodiments, the touch array TS and the display panel DP may be manufactured separately from each other and then combined to at least partially overlap each other. In other embodiments, the touch array TS and the display panel DP may be manufactured integrally with each other through continuous processes. In such embodiments, the touch array TS may be formed directly on at least one layer configuring the display panel DP, for example, a thin film encapsulation layer or an insulating layer of the display panel DP. However, the touch array TS is not limited to being disposed on the display panel DP. In another embodiment, for example, the touch array TS may be disposed under the display panel DP.

The touch array TS may include a sensing area SA capable of sensing a touch and a non-sensing area NSA around the sensing area SA. The sensing area SA may at least partially overlap the display area DA. The display device DD may display an image through the sensing area SA and may also sense a touch input on the display surface or sense light incident thereon from the front. The non-sensing area NSA may surround the sensing area SA, but this is an example and is not limited thereto.

The touch array TS may include a substrate and driving electrodes TX and sensing electrodes RX formed on the substrate. The driving electrodes TX and the sensing electrodes RX may be disposed in the sensing area SA on the substrate.

The display panel DP may include the display area DA for displaying an image, and the non-display area NDA surrounding the display area DA. The display panel DP may include pixels PX formed on the substrate. The pixels PX may be disposed in the display area DA.

Each of the pixels PX may be connected to a scan line SL, a data line DL, and an emission line EL. In an embodiment, for example, each of the pixels PX may be selected by a turn-on level of driving signal supplied through the scan line SL, and may receive a data signal through the data line DL. Accordingly, the pixels PX emit light with a luminance corresponding to the data signals, and an image may be displayed in the display area DA.

Lines and/or driving circuits connected to the pixels PX may be disposed in the non-display area NDA. In an embodiment, for example, at least one selected from a scan driver, an emission driver, and a data driver may be disposed in the non-display area NDA.

In embodiments, the display panel DP may include organic light emitting elements (e.g., organic light emitting diodes), inorganic light emitting elements (e.g., inorganic light emitting diodes), quantum dot/well light emitting elements (e.g., quantum dot/well light emitting diodes), or the like as the pixels PX. In other embodiments, the display panel DP may be implemented as a liquid crystal display panel. In such an embodiment, a light source such as a back-light unit may be additionally provided.

The display driver DDR may be electrically connected to the display panel DP to drive the pixels PX. In addition, the touch driver TDR may be connected to the touch array TS to drive the touch array TS.

In embodiments, the touch driver TDR and the display driver DDR may be configured as separate integrated chips (ICs). However, the disclosure is not limited thereto. In another embodiment, for example, the touch driver TDR and the display driver DDR may be included in a single IC.

Figure 4:
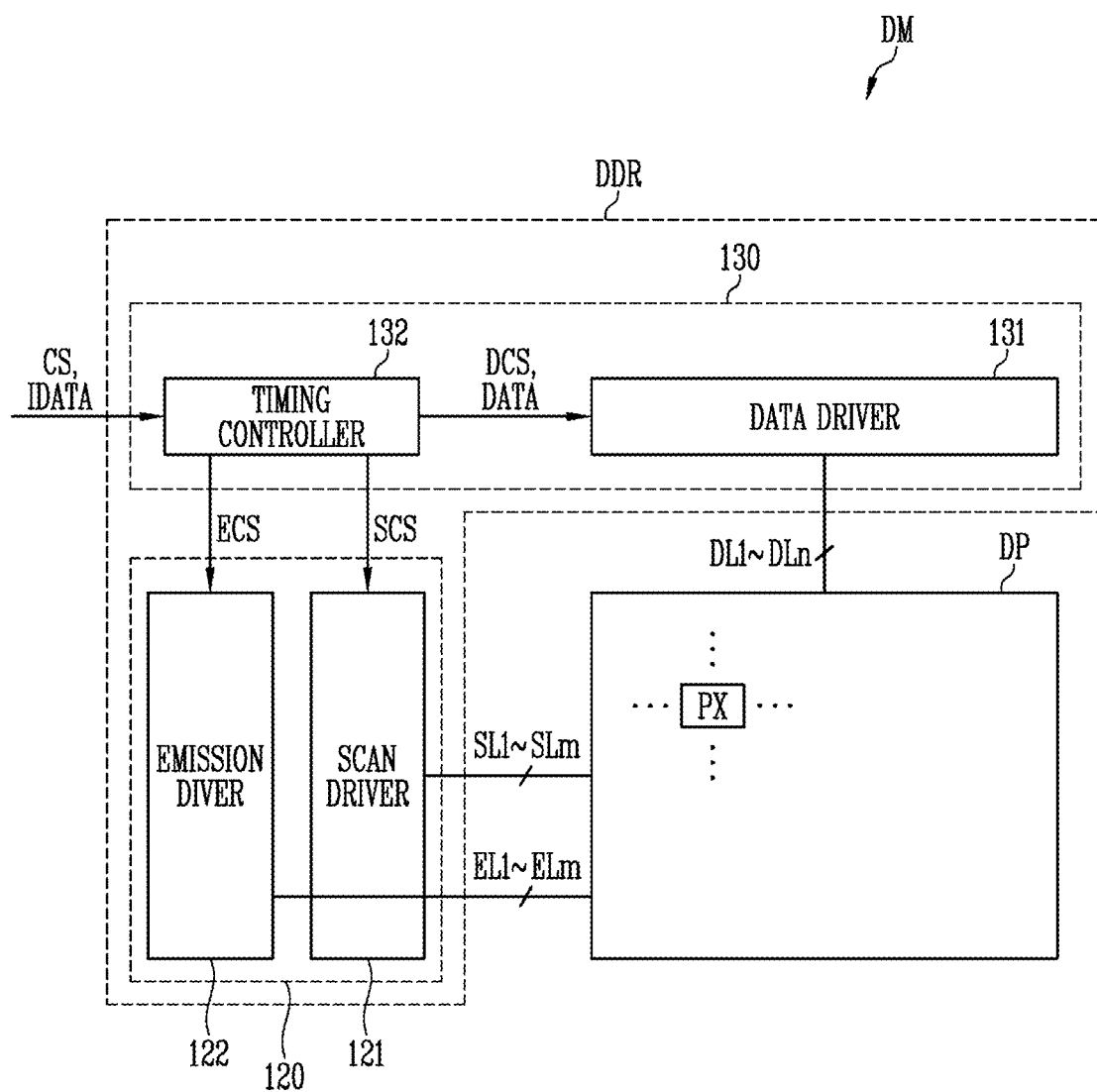
FIG. 4 is a block diagram illustrating an embodiment of a display module of FIG. 3.

FIG. 4 is a block diagram illustrating an embodiment of the display module of FIG. 3.

Referring to FIG. 4, an embodiment of the display module DM may include the display panel DP and the display driver DDR. In an embodiment, the display driver DDR may include a gate driving circuit 120, a panel driving circuit 130, and the like.

The pixels PX may be disposed in the display panel DP. In the display panel DP, a plurality of data lines DL1 to DL, a plurality of scan lines SL1 to SLm, a plurality of emission lines EL1 to Elm, and the like electrically connected to the pixels PX may be disposed.

Each of the pixels PX may include two or more sub-pixels. In an embodiment, for example, a plurality of sub-pixels may be disposed in a matrix structure, a PENTILE™ structure, or the like. However, embodiments of the disclosure are not limited to the above-described structure.

The gate driving circuit 120 may include a scan driver 121 and an emission driver 122. The gate driving circuit 120 may output gate signals (for example, a scan signal, an emission signal, or the like) having a high level voltage or a low level voltage to gate lines (for example, a scan line SL, an emission line EL, or the like).

The scan driver 121 may output the scan signals (for example, a turn-on level of scan signal) to the plurality of scan lines SL1 to SLm in response to a scan driver control signal SCS. In an embodiment, for example, the scan driver control signal SCS may include a start signal indicating a start of a frame, a horizontal synchronization signal for outputting the gate signal (for example, the scan signal) in accordance with a timing at which the data voltage is applied, and the like.

The scan driver 121 may be formed together with the display panel DP and may be formed in at least a partial area on the non-display area NDA (refer to FIG. 3) of the display panel DP. According to an embodiment, at least a portion of the scan driver 121 may be positioned to overlap the display area DA. However, the disclosure is not limited thereto. In an embodiment, for example, the scan driver 121 may be implemented as an integrated circuit (for example, a gate driver integrated circuit (GDIC)) formed separately from the display panel DP.

The emission driver 122 may output emission signals (for example, a turn-on level of emission signal) to the plurality of emission lines EL1 to ELm in response to an emission driver control signal ECS. In an embodiment, for example, the emission driver control signal ECS may include a start signal, a horizontal synchronization signal for outputting the gate signal (for example, the emission signal), and the like.

The emission driver 122 may be formed together with the display panel DP and may be formed in at least a partial area on the non-display area NDA of the display panel DP. According to an embodiment, at least a portion of the emission driver 122 may be positioned to overlap the display area DA. However, the disclosure is not limited thereto. In an embodiment, for example, the emission driver 122 may be implemented as an integrated circuit formed separately from the display panel DP.

The panel driving circuit 130 may include a data driver 131 and a timing controller 132. The panel driving circuit 130 may be implemented as a single integrated circuit, or the panel driving circuit 130 may be divided into two or more integrated circuits and implemented. integrated circuit example, the data driver 131 and the timing controller 132 may be functionally classified (or functional blocks) in one integrated circuit. In another embodiment, for example, the data driver 131 and the timing controller 132 may be implemented as separate integrated circuits. Hereinafter, for convenience of description, embodiments, in which the data driver 131 and the timing controller 132 are implemented as the panel driving circuit which is one integrated circuit, will be described as an example, but the disclosure is not limited thereto. In another embodiment, for example, the panel driving circuit 130 may be a driver integrated circuit DIC (refer to FIG. 8) implemented as a timing controller embedded driver integrated circuit (TED-IC).

The data driver 131 may supply data voltages to a plurality of data lines DL1 to DLn. The data driver 131 may generate data voltages based on image data DATA and a data driver control signal DCS, and output the generated data voltages to the plurality of data lines DL1 to DLn in accordance with a timing. In an embodiment, for example, the data driver control signal DCS may include a source start pulse, a source shift clock, a source output enable, or the like.

The timing controller 132 may be configured to control the data driver 131, the gate driving circuit, or the like. The timing controller 132 may receive a control signal CS (for example, a synchronization signal, a data enable signal, a clock signal, or the like) from an outside (for example, a host 140 (refer to FIG. 12). The timing controller 132 may generate and output the control signals DCS, SCS, ECS for controlling the data driver 131 and the gate driving circuit 120 based on the input control signal CS.

The timing controller 132 may receive input image data IDATA from the outside (for example, the host 140) and align the input image data IDATA in a pixel row unit. The timing controller 132 may convert the input image data IDATA in accordance with a preset interface (for example, low voltage differential signaling, display port, embedded display port, or the like. The image data DATA may be obtained by converting in the timing controller 132 according to a preset interface.

The timing controller 132 may receive the input image data IDATA, the control signal CS, or the like from an outside (for example, a host 140 shown in FIG. 12) through an interface such as serial programming interface (SPI), inter integrated circuit (I2C), and mobile industry processor interface (MIPI).

Figure 12:
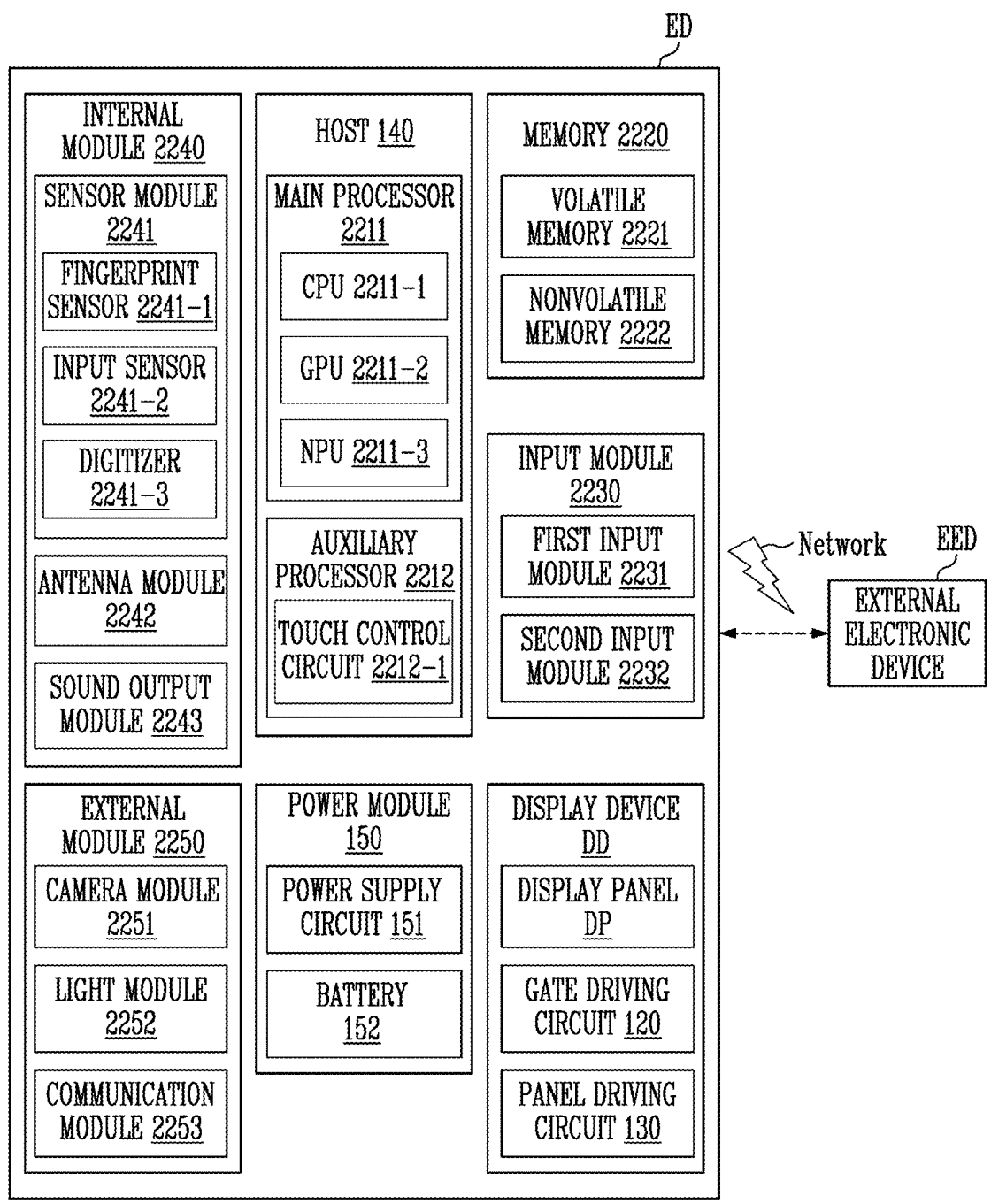
FIG. 12 is a system block diagram of an electronic device including a display device according to embodiments of the disclosure.

The timing controller 132 may receive power (for example, interface driving power, logic driving power, or the like) from the outside (for example, a power module 150 (refer to FIG. 12). The timing controller 132 may convert the input image data IDATA in accordance with a preset interface or align the input image data IDATA in a pixel row unit, by using the input power.

Figure 5:
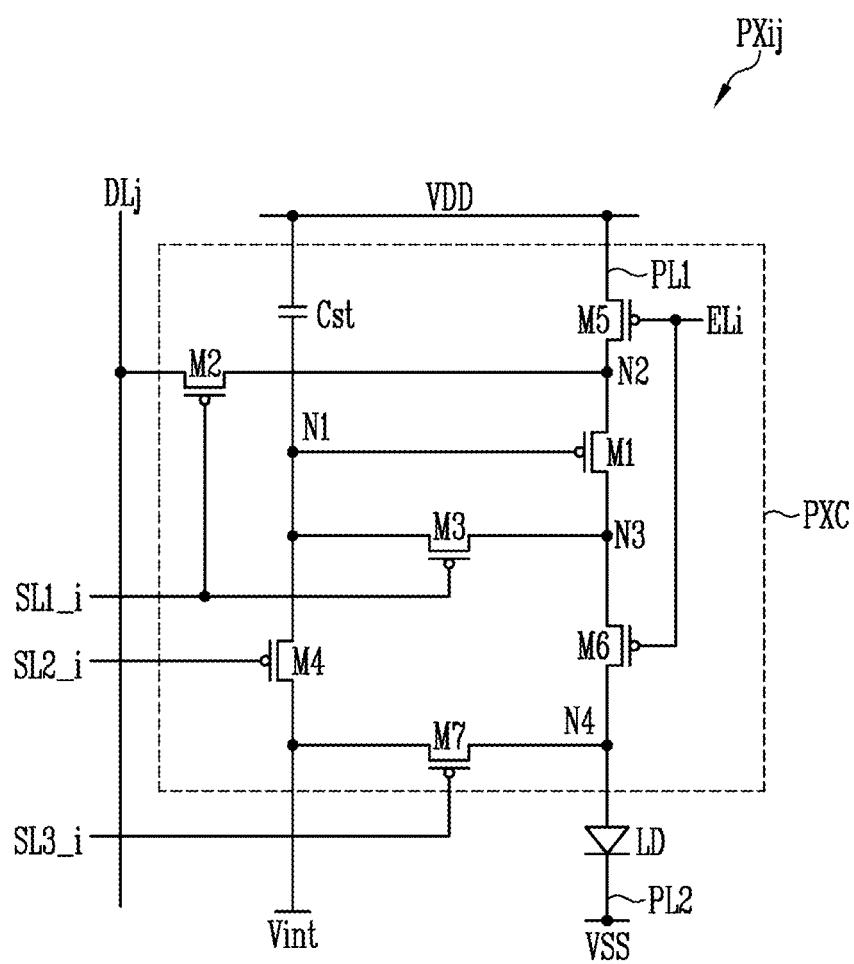
FIG. 5 is a circuit diagram illustrating an embodiment of a pixel included in the display module of FIG. 4.

FIG. 5 is a circuit diagram illustrating an embodiment of the pixel included in the display module of FIG. 4.

For convenience of illustration and description, FIG. 5 shows a pixel PXij disposed in an i-th row and a j-th column as an example. Here, i and j are natural numbers.

Referring to FIG. 5, an embodiment of the pixel PXij may include a pixel circuit PXC connected to an i-th scan line SLi and a j-th data line DLj, and a light emitting element LD connected to the pixel circuit PXC.

The light emitting element LD may be connected between a first power line PL1 supplied with a voltage of first driving power VDD and a second power line PL2 supplied with a voltage of second driving power VSS. In an embodiment, for example, the light emitting element LD may be connected to the first driving power VDD via the pixel circuit PXC and the first power wire PL1 and the second driving power VSS via the second power line PL2.

The pixel circuit PXC of the pixel PXij may be electrically connected to i-th scan lines SL1_i to SL3_i and the j-th data line DLj. In addition, the pixel circuit PXC may be electrically connected to an i-th emission control line ELi.

In an embodiment, as shown in FIG. 5, the pixel circuit PXC may include first to seventh transistors M1 to M7 and a storage capacitor Cst.

The first transistor M1 may be connected between a second node N2 and a third node N3. The first transistor M1 may generate a driving current and provide the driving current to the light emitting element LD. A gate electrode of the first transistor M1 may be connected to a first node N1. The first transistor T1 may control a current amount (driving current) flowing from the first driving power VDD to the second driving power VSS via the light emitting element LD based on a voltage of the first node N1.

The second transistor M2 may be connected between the j-th data line DLj and the second node N2. A gate electrode of the second transistor M2 may be connected to an i-th first scan line SL1_i. The second transistor M2 may be turned on when a first scan signal is supplied to the i-th first scan line SL1_i to electrically connect the data line DLj and the second node N2.

The third transistor M3 may be connected between the first node N1 and the third node N3. A gate electrode of the third transistor M3 may be connected to the i-th first scan line SL1_i. The third transistor M3 may be turned on simultaneously with the second transistor M2.

The fourth transistor M4 may be connected between the first node N1 and initialization power Vint. A gate electrode of the fourth transistor M4 may be connected to an i-th second scan line SL2_i. The fourth transistor M4 may be turned on by a second scan signal supplied to the second scan line SL2_i. When the fourth transistor M4 is turned on, a voltage of the initialization power Vint may be supplied to the first node N1 (that is, the gate electrode of the first transistor M1).

The fifth transistor M5 may be connected between the first driving power VDD and the second node N2. A gate electrode of the fifth transistor M5 may be connected to the i-th emission control line ELi. The sixth transistor M6 may be connected between the third node N3 and the light emitting element LD. A gate electrode of the sixth transistor M6 may be connected to the emission control line ELi. The fifth transistor M5 and the sixth transistor M6 may be turned off when an emission control signal is supplied to the emission control line ELi, and may be turned on in other cases.

According to an embodiment, when the fifth and sixth transistors M5 and M6 are turned on, the current flowing in the first transistor M1 may be transmitted to the light emitting element LD, and the light emitting element LD may emit light.

An emission period of the light emitting element LD may be determined in response to a turn-on period of the fifth and sixth transistors M5 and M6. In addition, the turn-on period of the fifth and sixth transistors M5 and M6 may correspond to an on duty (emission period) of the emission control signal, and a turn-off period of the fifth and sixth transistors M5 and M6 may correspond to an off-duty (non-emission period) of the emission control signal.

The seventh transistor M7 may be connected to a first electrode of the light emitting element LD (that is, the fourth node N4). A gate electrode of the seventh transistor M7 may be connected to an i-th third scan line SL3_i. The seventh transistor M7 may be turned on by a third scan signal supplied to the i-th third scan line SL3_i to supply the voltage of the initialization power Vint to the first electrode of the light emitting element LD.

The storage capacitor Cst may be connected between the first driving power VDD and the first node N1. In addition, the storage capacitor Cst may include a first storage electrode and a second storage electrode. The first storage electrode may be electrically connected to the first driving power VDD, and the second storage electrode may be electrically connected to the first node N1. The storage capacitor Cst may charge the data voltage corresponding to the data signal supplied to the first node N1 during one frame period. Accordingly, the storage capacitor Cst may store a voltage corresponding to a potential difference between a voltage of the gate electrode of the first transistor T1 and the first driving power VDD.

FIG. 5 shows an embodiment in which all of the first to seventh transistors M1 to M7 are P-type transistors, but the disclosure is not limited thereto. In an embodiment, for example, at least one selected from the first to seventh transistors M1 to M7 may be changed to an N-type transistor.

A structure of the pixel circuit PXC may be variously changed and implemented. In an embodiment, for example, the pixel circuit PXC may be configured by including seven transistors and two capacitors. According to an embodiment, the pixel circuit PXC may include five transistors and two capacitors. However, the disclosure is not limited thereto.

Figure 6:
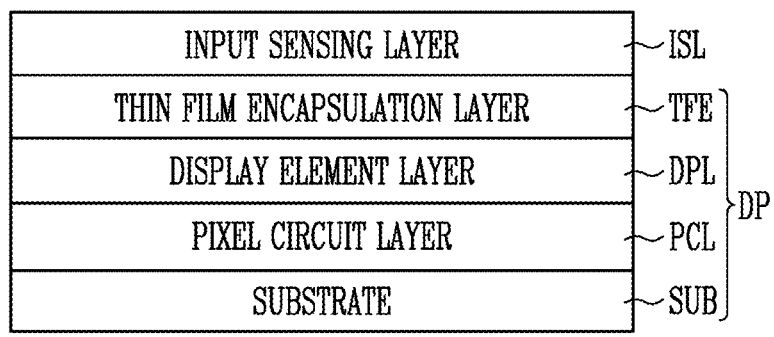
FIG. 6 is a cross-sectional view of the display panel of FIG. 4.

FIG. 6 is a cross-sectional view of the display panel of FIG. 4.

Referring to FIG. 6, an embodiment of the display panel DP may include a substrate SUB, and a pixel circuit layer PCL, a display element layer DPL, and a thin film encapsulation layer TFE sequentially stacked on the substrate SUB in the third direction DR3 crossing the first and second directions DR1 and DR2. An input sensing layer ISL may be stacked on the thin film encapsulation layer TFE of the display panel DP. In FIG. 6, the input sensing layer ISL is shown as a configuration separated from the display panel DP, but the input sensing layer ISL may be configured as at least one layer constituting the display panel DP.

The substrate SUB may be a rigid substrate or a flexible substrate. In an embodiment where the substrate SUB is the rigid substrate, the substrate SUB may be one of a glass substrate, a quartz substrate, a glass ceramic substrate, and a crystalline glass substrate. In an embodiment where the substrate SUB is the flexible substrate, the substrate SUB may be one of a film substrate and a plastic substrate including a polymer organic material. In addition, the substrate SUB may include fiber glass reinforced plastic.

The pixel circuit layer PCL may be disposed on the substrate SUB. The pixel circuit layer PCL may include insulating layers, and semiconductor patterns and conductive patterns which are disposed between the insulating layers. The conductive patterns of the pixel circuit layer PCL may function as circuit elements, lines, or the like.

The circuit elements of the pixel circuit layer PCL may include the pixel circuit PXC of FIG. 5. In other words, the circuit elements of the pixel circuit layer PCL may be provided as transistors and one or more capacitors of the pixel circuit PXC. In an embodiment, for example, each of the transistors may have a form in which a semiconductor layer, a gate electrode, and source/drain electrodes are sequentially stacked with an insulating layer therebetween. In addition, the pixel circuit layer PCL may include at least one or more insulating layers.

The lines of the pixel circuit layer PCL may include lines connected to each of the pixels PX. The lines of the pixel circuit layer PCL may include various signal lines and/or voltage lines used to drive the display element layer DPL.

The display element layer DPL may be disposed on the pixel circuit layer PCL. The display element layer DPL may include the light emitting element LD (refer to FIG. 5) that emits light. The light emitting element may be, for example, an organic light emitting diode, but the disclosure is not limited thereto. According to an embodiment, the light emitting element may be an inorganic light emitting element including an inorganic light emitting material or a light emitting element (quantum dot display element) that emits light by changing a wavelength of emitted light using a quantum dot. The organic light emitting diode may have, for example, a form in which an anode electrode, a hole transport layer, an organic light emitting layer, an electron transport layer, and a cathode electrode are sequentially stacked, but is not limited thereto.

The thin film encapsulation layer TFE may be disposed on the display element layer DPL. The thin film encapsulation layer TFE may be an encapsulation substrate or may have a form of an encapsulation film formed of a multilayer film. In an embodiment where the thin film encapsulation layer TFE has the form of the encapsulation film, the thin film encapsulation layer TFE may include an inorganic film and/or an organic film. In an embodiment, for example, the thin film encapsulation layer TFE may have a form in which an inorganic film, an organic film, and an inorganic film are sequentially stacked. The thin film encapsulation layer TFE may prevent external air and moisture from permeating into the display element layer DPL and the pixel circuit layer PCL.

The input sensing layer ISL may sense a user input on the display surface S1 (refer to FIG. 1) of the display panel DP. In an embodiment, for example, the input sensing layer ISL may sense an external object such as a user's hand or a pen through touch electrodes. The input sensing layer ISL may be provided as the touch array TA (refer to FIG. 3).

In embodiments, the input sensing layer ISL may be disposed directly on the thin film encapsulation layer TFE. In this case, at least one layer of the thin film encapsulation layer TFE may be provided as a support layer (or substrate) for the input sensing layer ISL. In other embodiments, the input sensing layer ISL may be formed on a separate substrate, and the input sensing layer ISL formed on the separate substrate may be attached to the thin film encapsulation layer TFE.

Figure 7:
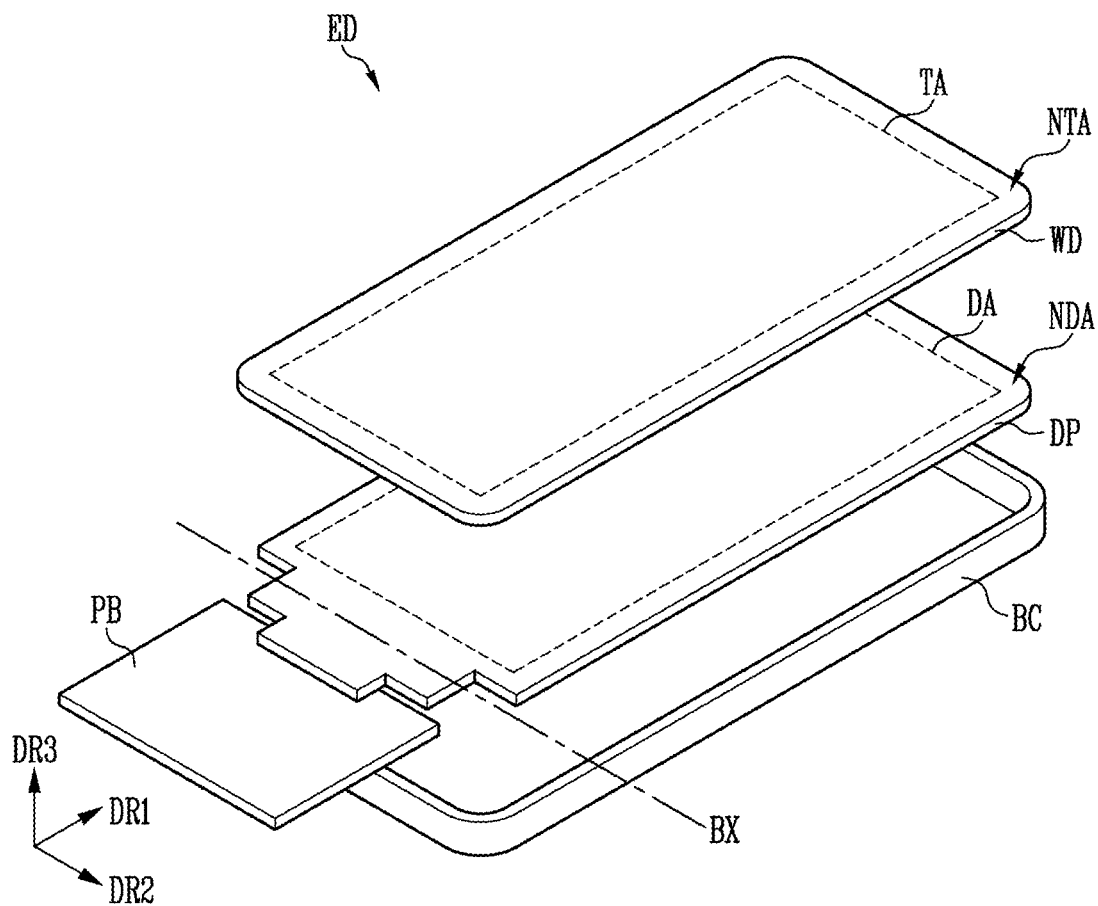
FIG. 7 is an exploded perspective view illustrating the electronic device of FIG. 1.

FIG. 7 is an exploded perspective view illustrating the electronic device of FIG. 1. In FIG. 7, for convenience of illustration and description, the display panel of a state in which the display panel is not bent is shown.

Referring to FIG. 7, an embodiment of the electronic device ED may include a window WD, the display panel DP, and a receiving member BC. Although not shown in FIG. 7, the electronic device ED may further include the touch array TA (refer to FIG. 3) between the window WD and the display panel DP.

The window WD may provide the first surface S1 (refer to FIG. 1) of the electronic device ED. In addition, the window WD may include a transmission area TA and a non-transmission area NTA. For example, the window WD may be disposed on a display surface DS1 (refer to FIG. 11) of the display panel DP to protect the display panel DP from external shock. In addition, the window WD may transmit the image provided from the display panel DP to the transmission area TA. In such an embodiment of the electronic device ED, the image displayed in the display area DA of the display panel DP may be viewed from the outside through the transmission area TA of the window WD.

The window WD may have a multilayer structure including at least one selected from a glass substrate, a plastic film, and a plastic substrate. The multilayer structure may be formed through a continuous process or an adhesion process using an adhesive layer. The window WD may be fully or partially flexible.

The display panel DP may have a structure that is bent at a certain curvature along a bending axis BX. In an embodiment, for example, the display panel DP may be bent in a direction opposite to the third direction D3 based on the bending axis BX.

A circuit board PB may be connected to one end (or one side surface) of the display panel DP. The circuit board PB may be disposed on a rear surface DS2 (refer to FIG. 11) of the display panel DP. The display panel DP may overlap and may be connected to the circuit board PB at the one end (or one side surface) of the display panel DP. However, as the circuit board PB overlaps the display panel DP, an area where elements may be disposed on the circuit board PB may be reduced.

The circuit board PB may be connected to the display panel DP to provide a driving signal and a voltage. In an embodiment, for example, the driving signal may be a signal that controls the display panel DP to display an image, and the voltage may be a driving voltage required to drive the display panel DP.

The circuit board PB may be coupled to the display panel DP by an ultrasonic bonding method or a conductive adhesive member (not shown). In addition, the circuit board PB may be fixed (e.g., bonded or attached) to the display panel DP through a thermal compression process. According to an embodiment, the conductive adhesive member may include conductive particles formed in an adhesive film having an adhesive property. In such an embodiment, first pads PD1 (refer to FIG. 8) of the display panel DP and second pads PD2 (refer to FIG. 8) of the circuit board PB may be electrically connected through the conductive particles.

The circuit board PB may be configured in various forms. The circuit board PB may be provided as a flexible printed circuit board (FPCB). In an embodiment, for example, the circuit board PB may be configured by stacking at least one layer of copper foil on one surface or both surfaces of a base board including or formed of epoxy resin or the like, or may be configured by stacking at least one layer of copper foil on one surface or both surfaces of a flexible plastic film. In addition, the circuit board PB may have a multilayer structure in which copper foil is formed inside a base substrate.

The receiving member BC may be combined with the window WD. The receiving member BC may provide the second surface S2 (refer to FIG. 2) of the electronic device ED. The receiving member BC may be combined with the window WD to define an internal space. The receiving member BC may include a material with relatively high rigidity. In an embodiment, for example, the receiving member BC may include a plurality of frames and/or plates formed of glass, plastic, or metal. The receiving member BC may stably protect configurations of the electronic device ED accommodated in the internal space from external shock.

In addition, the receiving member BC may include a flexible material. In embodiments, the electronic device ED may have a foldable or bendable property. In an embodiment, for example, as described above, the electronic device ED may be folded based on the folding axis FX (refer to FIG. 2). As a result, the configurations included in the electronic device ED may also have a flexible property.

Figure 8:
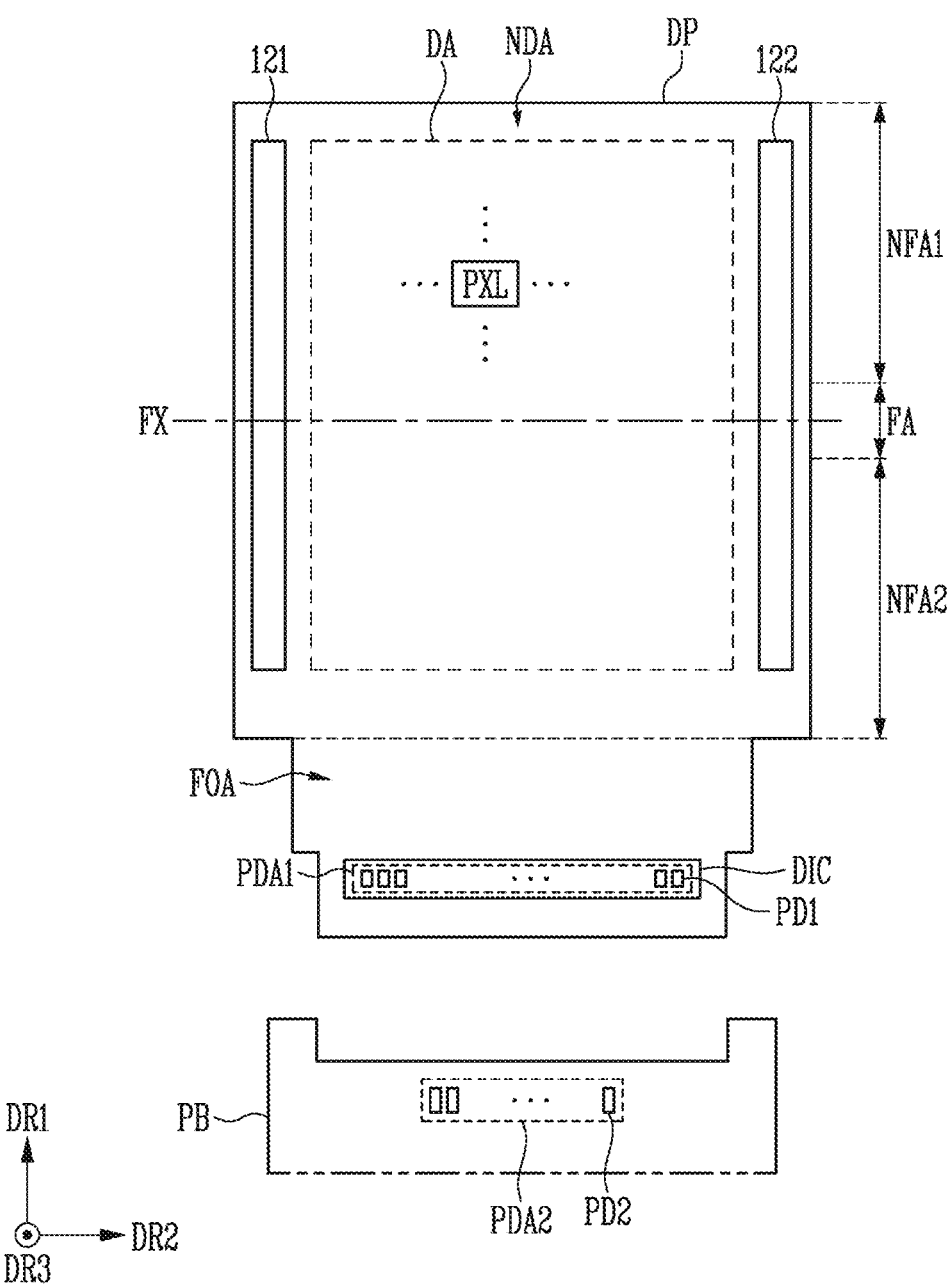
FIG. 8 is a plan view of a display panel of FIG. 7.

FIG. 8 is a plan view of the display panel of FIG. 7. In FIG. 8, for convenience of illustration and description, the display panel in a state in which the display panel is not bent is shown.

Referring to FIG. 8, an embodiment of the display panel DP may include the display area DA, the non-display area NDA, and a fan-out area FOA.

The display area DA and the non-display area NDA of the display panel DP may include a first unfoldable area NFA1, a foldable area FA, and a second unfoldable area NFA2 sequentially disposed in a direction opposite to the first direction DR1. In addition, the foldable area FA may be folded based on the folding axis FX extending along the second direction DR2.

The scan driver 121 and the emission driver 122 may be disposed in the non-display area NDA of the display panel DP. Lines, which are connected to the display panel DP, the scan driver 121 and the emission driver 122, may be disposed in the fan-out area FOA extending from the non-display area NDA of the display panel DP. A first pad area PDA1 in which the first pads PD1 are disposed may be further disposed in the fan-out area FOA. The lines, which are connected to the display panel DP, the scan driver 121 and the emission driver 122, may be connected to at least a portion of the first pads PD1.

Referring to FIGS. 4 and 8, the display panel DP may include the pixels PX, the plurality of scan lines SL1 to SLm, the plurality of emission lines EL1 to ELm, and the plurality of data lines DL1 to DLn. According to an embodiment, the scan lines SL1 to SLm may extend in a direction opposite to the second direction DR2 and may be connected to the scan driver 121. The emission lines EL1 to ELm may extend in the second direction DR2 and may be connected to the emission driver 122. In addition, the data lines DL1 to DLn may extend in the first direction DR1 and may be electrically connected to at least a portion of the first pads PD1 via the fan-out area FOA.

The driver integrated circuit DIC may be disposed on the display panel DP. The driver integrated circuit DIC may be disposed in the fan-out area FOA.

The driver integrated circuit DIC may be connected to at least a portion of the first pads PD1. The driver integrated circuit DIC may provide signals required to drive the display panel DP through the first pads PD1 and lines of the display panel DP. The driver integrated circuit DIC may include at least one selected from the data driver 131 and the timing controller 132 of FIG. 4. In an embodiment, for example, the driver integrated circuit DIC may be a source driver integrated circuit including the data driver 131. In another embodiment, for example, the driver integrated circuit DIC may be an integrated driver integrated circuit including not only the data driver 131 but also the timing controller 132. In addition, various driving circuits of the display module DM for controlling the display panel DP of FIG. 4 may be included in the driver integrated circuit DIC. As shown in FIG. 8, a single driver integrated circuit DIC may be disposed on the display panel DP, but alternatively, a plurality of driver integrated circuits may also be disposed on the display panel DP.

The driver integrated circuit DIC may be disposed on the display panel DP to overlap the first pad area PDA1. In addition, the driver integrated circuit DIC may be disposed on the display panel DP in a chip-on glass (COG) method or a chip-on plastic (COP) method.

The circuit board PB may include a second pad area PDA2. The second pad area PDA2 includes the second pads PD2. The second pads PD2 may be electrically connected to at least a portion of the first pads PD1 and/or the driver integrated circuit DIC. In the disclosure, an electrical connection may include not only a structure in which a first electric part and a second electric part are directly connected to each other but also a structure in which the first electric part and the second electric part are connected to each other through another electrical part.

At least a portion of the second pads PD2 may be connected to the driver integrated circuit DIC to transmit signals. In an embodiment, for example, a host such as a processor may be mounted on the circuit board PB. The host may provide signals such as the input image data IDATA and the control signal CS of FIG. 4 to the driver integrated circuit DIC through at least a portion of the second pads PD2. In an embodiment, for example, the timing controller 132 of FIG. 4 may be mounted on the circuit board PB. The timing controller 132 may provide signals such as the data driver control signal DCS and the image data DATA of FIG. 4 to the driver integrated circuit DIC through at least a portion of the second pads PD2.

Another portion of the second pads PD2 may be connected to a portion of the first pads PD1. In an embodiment, for example, the display panel DP may receive a signal and/or a voltage from a component mounted on the circuit board PB through the first and second pad areas PDA1 and PDA2. In other words, the display panel DP may receive a signal and/or a voltage from a component of the circuit board PB rather than the driver integrated circuit DIC. In an embodiment, for example, electrical elements such as a capacitor and a diode may be mounted on the circuit board PB, and the electrical elements may be connected to the driver integrated circuit DIC through the first and second pad areas PDA1 and PDA2. In other words, electrical elements used for the driver integrated circuit DIC may be disposed on the circuit board PB.

Figure 9:
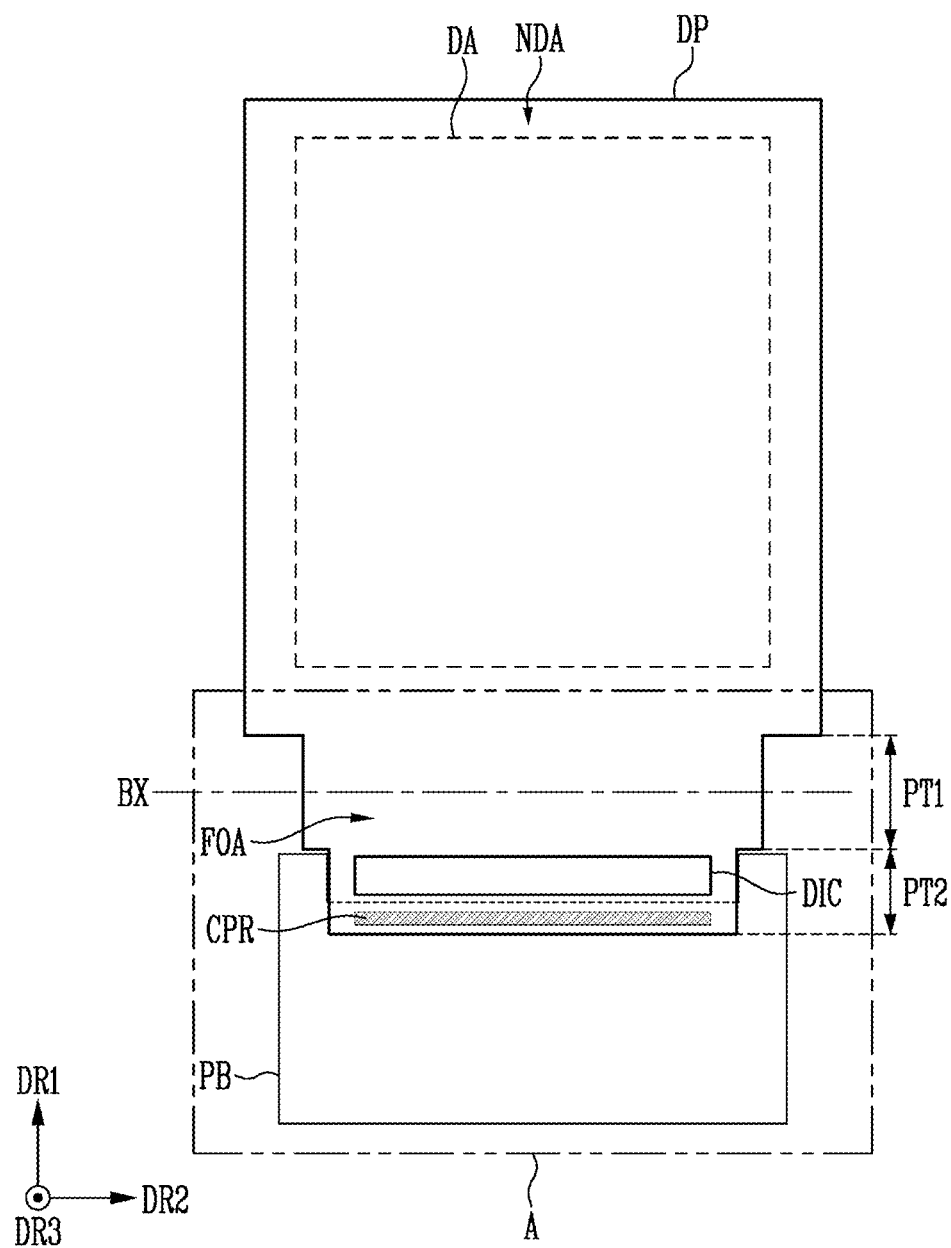
FIG. 9 is a plan view illustrating an embodiment of the display panel of FIG. 7.

FIG. 9 is a plan view illustrating an embodiment of the display panel of FIG. 7. In FIG. 9, for convenience of illustration and description, the display panel of a state in which the display panel is not bent.

Referring to FIG. 9, an embodiment of the display panel DP may include a first portion PT1 and a second portion PT2 in the fan-out area FOA. Hereinafter, any repetitive detailed description of the same elements as those of the display panel DP and the circuit board PB described above with reference to FIGS. 7 and 8 will be omitted.

The display panel DP may include the first portion PT1 extending from the non-display area NDA and bent, and the second portion PT2 extending from the first portion PT1, protruding from the first portion PT1, and connected to the circuit board PB.

The first portion PT1 of the display panel DP may extend from the non-display area NDA in a direction opposite to the first direction DR1. The first portion PT1 may be bent in a direction opposite to the third direction DR3 around the bending axis BX. In addition, the first portion PT1 may be positioned between one end of the non-display area NDA and the circuit board PB. In an embodiment, for example, in a state in which the display panel is not bent, the first portion PT1 may be positioned between the non-display area NDA and the circuit board PB.

The second portion PT2 of the display panel DP may extend from the first portion PT1. The second portion PT2 may be disposed to face the rear surface DS2 (refer to FIG. 11) of the display panel DP in a state in which the first portion PT1 is bent. In an embodiment, for example, in a state in which the first portion PT1 is bent in a direction opposite to the third direction DR3, the second portion PT2 may extend from the first portion PT1 in the first direction DR1. In a state in which the first portion PT1 is bent in a direction opposite to the third direction DR3, the second portion PT2 may overlap the circuit board PB.

The second portion PT2 of the display panel DP may be connected to the circuit board PB. In an embodiment, for example, the circuit board PB may be fixed to the second portion PT2 of the display panel DP. In an embodiment, for example, during a manufacturing process, heat and pressure may be applied to a compression portion CPR in a state in which the circuit board PB is connected to the second portion PT2 of the display panel DP, and thus the circuit board PB may be fixed to the second portion PT2 of the display panel DP.

In a case where the second portion PT2 of the display panel DP and the circuit board PB overlap each other, a space where parts may be disposed on the circuit board PB may be insufficient. In particular, when the display panel DP includes the foldable area FA (refer to FIG. 8), a size of the circuit board PB may be reduced. In a case, for example, the circuit board PB may be designed to have a relatively small size not to overlap the first unfoldable area NFA1 and the foldable area FA and to overlap only the second unfoldable area NFA2, so that the display panel DP may be folded without interference of the circuit board PB. In this case, the space where parts may be disposed on the circuit board PB may be further insufficient.

In an embodiment, the second portion PT2 of the display panel DP may have a shape protruding from the first portion PT1. In an embodiment, for example, in a state in which the first portion PT1 is bent in a direction opposite to the third direction DR3, the second portion PT2 may protrude from the first portion PT1 in the first direction DR1. According to an embodiment, by cutting a portion of the second portion PT2, the second portion PT2 may have a shape protruding from the first portion PT1. The second portion PT2 may extend from the first portion PT1 and may have a width narrower than that of the first portion PT1. That is, the second portion PT2 may have a width narrower than that of the non-display area NDA and the first portion PT1 of the display panel DP. Here, the width may mean a length along the second direction DR2 of a corresponding component.

As the second portion PT2 of the display panel DP has a shape protruding from the first portion PT1, the circuit board PB may additionally secure an area that does not overlap the display panel DP.

In an embodiment, as described above, by forming the width of the second portion PT2 of the display panel DP to be relatively narrow, the circuit board PB may secure an additional area in the second direction of the second portion PT2 or the direction opposite to the second direction. In such an embodiment, the circuit board PB may secure an additional area in both of the second direction of the second portion PT2 and the direction opposite to the second direction. Accordingly, an area where parts may be disposed in the circuit board PB may be more effectively used. Such features will hereinafter be described in detail with reference to FIG. 10.

Figure 10:
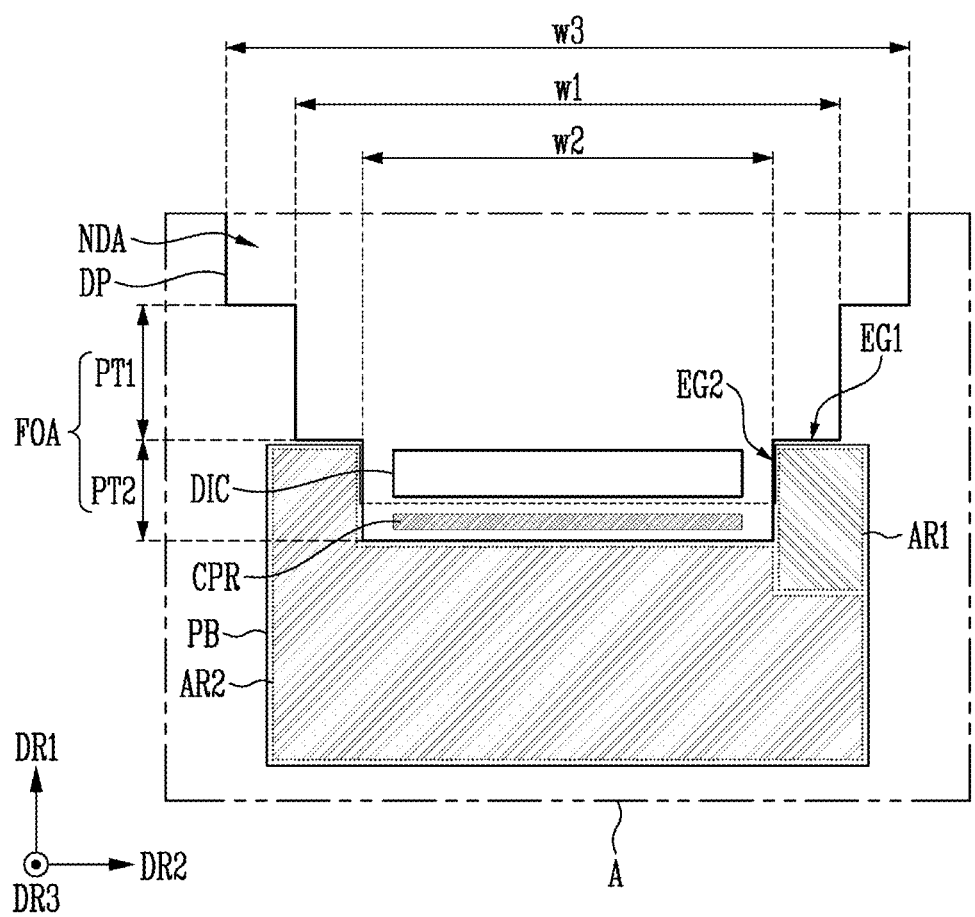
FIG. 10 is an enlarged view illustrating a portion A of FIG. 9.

FIG. 10 is an enlarged view illustrating a portion A of FIG. 9.

Referring to FIG. 10, the circuit board PB may include a first area AR1 and a second area AR2. The first area AR1 of the circuit board PB may be disposed adjacent to the second portion PT2 of the display panel DP in the second direction DR2 or the direction opposite to the second direction DR2. The second area AR2 of the circuit board PB may be disposed adjacent to the second portion PT2 of the display panel DP in the first direction DR1 or the direction opposite to the first direction DR1. In FIG. 10, the first area AR1 is shown to be disposed adjacent to the second portion PT2 of the display panel DP in the second direction DR2, but is not limited thereto. In an embodiment, for example, the first area AR1 may be disposed adjacent to the second portion PT2 of the display panel DP in the direction opposite to the second direction DR2. Alternatively, the first area AR1 may be disposed adjacent to the second portion PT2 on both sides in the second direction DR2 and the direction opposite to the second direction DR2 based on the second portion PT2 of the display panel DP.

The display panel DP may include a first portion PT1 and a second portion PT2 in the fan-out area FOA extending from the non-display area NDA. The second portion PT2 of the display panel DP may overlap at least a portion of the circuit board PB. In addition, the second portion PT2 may include a compression portion CPR. The driver integrated circuit DIC may be disposed in the second portion PT2.

According to an embodiment, the first portion PT1 of the display panel DP may have a first width W1 in the second direction DR2. The second portion PT2 of the display panel DP may have a second width W2 in the second direction DR2. In such an embodiment, the second width W2 of the second portion PT2 may be less than the first width W1 of the first portion PT1.

In an embodiment, the first portion PT1 of the display panel DP may be positioned between the non-display area NDA and the second portion PT2. According to an embodiment, the first portion PT1 of the display panel DP may have a first width W1 in the second direction DR2. The non-display area NDA or the display surface DS1 of the display panel DP may have a third width W3 greater than that of the first portion PT1 in the second direction DR2. In such an embodiment, the third width W3 of the display surface DS1 may be greater than the first width W1 of the first portion PT1.

In an embodiment, as described above, the display panel DP may have a width that gradually narrows in the fan-out area FOA as a distance from the non-display area NDA increases. In particular, the second portion PT2 where the display panel DP and the circuit board PB overlap may have a width narrower than that of the first portion PT1.

As the second portion PT2 of the display panel DP has a protruding shape, the circuit board PB may additionally include a first area AR1. Therefore, the first area AR1 of the circuit board PB may be additionally used to dispose parts thereon. In an embodiment, for example, the circuit elements electrically connected to the driver integrated circuit DIC may be disposed in the first area AR1. In an embodiment, for example, the circuit elements disposed in the first area AR1 may be capacitors, diodes, or the like, and such circuit elements may be electrically connected to the driver integrated circuit DIC. However, the disclosure is not limited thereto. In an embodiment, for example, where the touch array TA (refer to FIG. 3) is disposed on the display panel DP, a touch driving circuit configured to control the touch array TS may be disposed in the first area AR1.

Referring to FIG. 10, the first portion PT1 of the display panel DP may have a first edge EG1 adjacent to the first area AR1 and extending in the second direction DR2. The second portion PT2 of the display panel DP may have a second edge EG2 adjacent to the first area AR1 and extending in the first direction DR1. The first area AR1 may be formed adjacent to the first edge EG1 and the second edge EG2 on the circuit board PB. The first area AR1 may be a position moved in the first direction DR1 on the circuit board PB to be adjacent to the first portion PT1 of the display panel DP. That is, the first area AR1 may be formed in a position closer to the first portion PT1 of the display panel DP than to the compression portion CPR in the first direction DR1. In addition, the first area AR1 may be formed at a position spaced apart from the driver integrated circuit DIC and/or the first pads PD1 in the second direction DR2.

The circuit board PB may include a second area AR2. The second area AR2 may refer to an area overlapping the display panel DP and an area of the circuit board PB excluding the first area AR1. The second area AR2 may have a larger area as the first area AR1 is adjacent to the second portion PT2 of the display panel DP. In an embodiment, for example, the area of the second area AR2 may be greater than the area of the first area AR1. In addition, the area of the second area AR2 may become larger as the first area AR1 moves in the first direction DR1 based on the compression portion CPR. Here, at least one of a battery, a sensor module, an antenna module, or a sound output module may be disposed in the second area AR2. However, the parts disposed in the second area AR2 are not limited thereto.

According to an embodiment, the circuit board PB may have a shape complementary to that of the display panel DP. That is, the circuit board PB may have a shape in which both ends protrude in the first direction DR1 on one side facing the display panel DP. In an embodiment, for example, the circuit board PB may have a shape protruding in the first direction DR1 to face the first and second edges EG1 and EG2 of the display panel DP at both ends in the second direction DR2. The circuit board PB may include a first area AR1 in a protruding portion. In such an embodiment, since the circuit board PB has a protruding shape, one side facing the display panel DP may be disposed between the driver integrated circuit DIC and the compression portion CPR at a portion overlapping the display panel DP.

In an embodiment, as described above, the display panel DP may include the second portion PT2 having a shape protruding from the first portion PT1, and thus an area where the display panel DP and the circuit board PB overlap may be reduced. In such an embodiment, as the first area AR1 of the circuit board PB is additionally provided, the area of the circuit board PB where parts may be disposed may increase. In addition, by utilizing the increased area of the circuit board PB, parts may be efficiently and/or effectively disposed.

Figure 11:
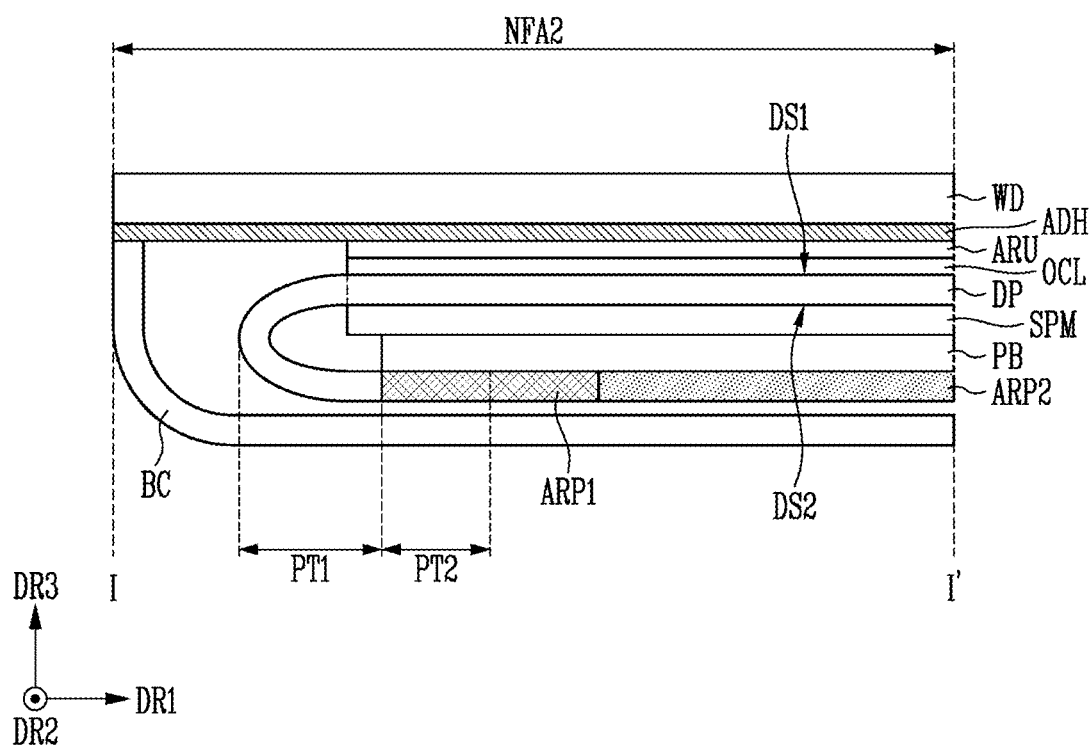
FIG. 11 is a cross-sectional view taken along line I-I' of FIG. 1.

FIG. 11 is a cross-sectional view taken along line I-I' of FIG. 1.

Referring to FIG. 11, an embodiment of the electronic device ED may include the window WD, the display panel DP, the circuit board PB, and the receiving member BC.

The electronic device ED may include an optical layer ARU and an overcoat layer OCL between the window WD and the display panel DP. The window WD may be coupled to the optical layer ARU by an adhesive member ADH. Here, the adhesive member ADH may include an optically transparent viscosity (or adhesive) member.

The electronic device ED may include a support member SPM, the circuit board PB, and first and second area parts ARP1 and ARP2 between the display panel DP and the receiving member BC. According to an embodiment, in a cross-sectional view, the display panel DP in the second unfoldable area NFA2 may include the display surface DS1 and the rear surface DS2 opposite to the display surface DS1. The display surface DS1 may be one surface of the display panel DP which is in contact with (or contacting) the overcoat layer OCL, and the rear surface DS2 may be another surface of the display panel DP which is in contact with the support member SPM.

The display panel DP may include the first portion PT1 bent in the direction opposite to the third direction DR3, and the second portion PT2 extending from the first portion PT1 in the first direction DR1, facing the rear surface DS2, protruding from the first portion PT1 in the first direction DR1, and connected to the circuit board PB.

The first portion PT1 may have a curved or bent shape with a predetermined radius of curvature. In an embodiment, for example, the first portion PT1 may have a shape convex in the direction opposite to the first direction DR1 of the display panel DP.

The second portion PT2 may overlap the circuit board PB. As shown in FIG. 11, as the display panel DP has a bending structure, the first and second area parts ARP1 and ARP2 mounted on the circuit board PB may be disposed between the circuit board PB and the receiving member BC. The first area parts ARP1 may be parts disposed in a first area adjacent to the second portion PT2 in the second direction DR2. In addition, the second area parts ARP2 may be parts disposed in a second area adjacent to the second portion PT2 in the first direction DR1. Here, the second portion PT2 may extend from the first portion PT1 in the first direction DR1 and have a protruding shape having a width narrower than that of the first portion PT1 in the second direction DR2.

According to an embodiment, when viewed in the second direction DR2, the first area parts ARP1 may overlap the second portion PT2. In addition, the first area parts ARP1 may overlap at least a portion of the second area parts ARP2.

In addition, when viewed in the second direction DR2, the first area parts ARP1 may overlap the compression portion CPR of the second portion PT2. In particular, the first area parts ARP1 may be disposed adjacent to the first portion PT1 than to the compression portion CPR. In addition, the first area parts ARP1 may be disposed on the same line as the second portion PT2 in the second direction DR2. As described above, due to the protruding shape of the second portion PT2, the first area parts ARP1 may be moved and disposed adjacent to the first portion PT1 of the display panel DP. In addition, an area where the second area parts ARP2 are disposed may become wider. Accordingly, a dead space in the circuit board PB may be reduced and parts may be efficiently disposed.

FIG. 12 is a system block diagram of an electronic device including a display device according to embodiments of the disclosure.

Referring to FIG. 12, an embodiment of the electronic device ED including the display device DD may output various pieces of information. When the host 140 executes an application stored in a memory 2220, the electronic device ED may provide application information to a user through the display panel DP.

The host 140 may obtain an external input through an input module 2230, a sensor module 2241, or the like and execute an application corresponding to the external input. For example, when the user of the electronic device ED selects a camera icon (or a camera application) displayed on the display panel DP, the host 140 may obtain a user input through an input sensor 2241-2 and activate a camera module 2251. The host 140 may transfer image data corresponding to a captured image obtained through the camera module 2251 to the electronic device ED. The electronic device ED may display an image corresponding to the captured image through the display panel DP.

In the above, an operation of the electronic device ED is briefly described. Hereinafter, a configuration of the electronic device ED will be described in detail. Some of configurations of the electronic device ED to be described later may be integrated and provided as one configuration, and one configuration may be separated into two or more configurations and provided.

The electronic device ED may communicate with an external electronic device EED through a network (for example, a short-range wireless communication network or a long-range wireless communication network).

According to an embodiment, the electronic device ED may include the host 140, the memory 2220, the input module 2230, the display device DD, a power module 150, an internal module 2240, an external module 2250, and the like. According to an embodiment, in the electronic device ED, at least one of the above-described components may be omitted or one or more other components may be added.

The host 140 may execute software to control at least another component (for example, a hardware or software component) of the electronic device ED connected to the host 140, and perform various data processing or operations.

The host 140 may include a main processor 2211 and an auxiliary processor 2212. The main processor 2211 may include one or more of a central processing unit (CPU) 2211-1 or an application processor (AP). The main processor 2211 may further include any one of a graphic processing unit (GPU) 2211-2, a communication processor (CP), and an image signal processor (ISP). The main processor 2211 may further include a neural processing unit (NPU) 2211-3.

The host 140 may be disposed on the second area AR2 (refer to FIG. 10) of the circuit board PB (refer to FIG. 10). In an embodiment, for example, the host 140 may be mounted on the circuit board PB and may provide signals such as the input image data IDATA (refer to FIG. 4) and the control signal CS (refer to FIG. 4) through the driver integrated circuit DIC (refer to FIG. 8).

The auxiliary processor 2212 may further include a touch driving circuit 2212-1. The touch driving circuit 2212-1 may supply a touch signal to the input sensor 2241-2 and receive a sensing signal from the input sensor 2241-2 in response to the touch signal. The touch driving circuit 2212-1 may be disposed on the first area AR1 (refer to FIG. 10) of the circuit board PB (refer to FIG. 10).

The memory 2220 may store various data used by at least one component (for example, the host 140 or the sensor module 2241) of the electronic device ED, and input data or output data for a command related thereto. The memory 2220 may include at least one selected from the volatile memory 2221 and the nonvolatile memory 2222.

The input module 2230 may receive a command or data to be used by a component (for example, the host 140, the sensor module 2241, or the sound output module 2243) of the electronic device ED from an outside (for example, the user or the external electronic device EED) of the electronic device ED.

The input module 2230 may include a first input module 2231 to which a command or data is input from the user and a second input module 2232 to which a command or data is input from the external electronic device EED. The first input module 2231 may include a microphone, a mouse, a keyboard, a key (for example, a button), or a pen (for example, an active pen). The second input module 2232 may support a designated protocol capable of connecting to the external electronic device EED by wire or wirelessly. According to an embodiment, the second input module 2232 may include a high definition multimedia interface (HDMI), a universal serial bus (USB) interface, an SD card interface, or an audio interface.

The display device DD may visually provide information to the user of the electronic device ED. The display device DD may include the display panel DP, the gate driving circuit 120, the panel driving circuit 130, and the like.

The power module 150 may supply power to a component of the electronic device ED. The power module 150 may include a battery 152 that charges a power voltage. The battery 152 may be disposed on the second area AR2 (refer to FIG. 10) of the circuit board PB. The battery 152 may include a non-rechargeable primary cell, a rechargeable secondary cell or fuel cell, or the like. A power supply circuit may include a power management integrated circuit (PMIC).

The electronic device ED may include the internal module 2240 and the external module 2250. The internal module 2240 may include the sensor module 2241, the antenna module 2242, the sound output module 2243, and the like. Here, at least one of the internal modules 2240 may be disposed on the second area AR2 (refer to FIG. 10) of the circuit board PB. In addition, the external module 2250 may include the camera module 2251, a light module 2252, the communication module 2253, and the like.

The sensor module 2241 may sense an input by a body of the user or an input by a pen among the first input module 2231, and may generate an electrical signal or a data value corresponding to the input. The sensor module 2241 may include at least one of the fingerprint sensor 2241-1, the input sensor 2241-2, and a digitizer 2241-3.

At least one selected from the fingerprint sensor 2241-1, the input sensor 2241-2, and the digitizer 2241-3 may be implemented as (or defined by) a sensor layer formed on the display panel DP through a successive process. At least one selected from the fingerprint sensor 2241-1, the input sensor 2241-2, and the digitizer 2241-3 may be disposed on one side (for example, a display surface) of the display panel DP, and another one selected from the fingerprint sensor 2241-1, the input sensor 2241-2, and the digitizer 2241-3, for example, the digitizer 2241-3 may be disposed on another side (for example, a rear surface) of the display panel DP.

At least two selected from the fingerprint sensor 2241-1, the input sensor 2241-2, and the digitizer 2241-3 may be formed to be integrated into one sensing panel through a same process. In an embodiment where at least two selected from the fingerprint sensor 2241-1, the input sensor 2241-2, and the digitizer 2241-3 are integrated into one sensing panel, the sensing panel may be disposed between the display panel DP and the window disposed above the display panel DP. According to an embodiment, the sensing panel may be disposed on the window. A position of the sensing panel is not particularly limited.

The sensor module 2241 may further generate an electrical signal or a data value corresponding to an internal state or an external state of the electronic device ED. The sensor module 2241 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, or the like.

The antenna module 2242 may include one or more antennas for transmitting a signal or power to an outside or receiving a signal or power from an outside. According to an embodiment, the communication module 2253 may transmit a signal to the external electronic device EED or receive a signal from the external electronic device EED through an antenna suitable for a communication method.

The sound output module 2243 is a device for outputting a sound signal to an outside of the electronic device ED, and may include, for example, a speaker used for general purposes such as multimedia playback or recording playback, a receiver used exclusively for receiving a call, and the like. According to an embodiment, the receiver may be formed integrally with or separately from the speaker.

The camera module 2251 may capture a still image (for example, a photograph) and a moving image. According to an embodiment, the camera module 2251 may include one or more lenses, an image sensor, an image signal processor, an infrared camera, or the like.

The light module 2252 may provide light. The light module 2252 may include a light emitting diode or a xenon lamp.

The communication module 2253 may support establishment of a wired or wireless communication channel between the electronic device ED and the external electronic device EED and communication performance through the established communication channel. The communication module 2253 may include any one or both of a wireless communication module such as a cellular communication module, a short-range wireless communication module, or a global navigation satellite system (GNSS) communication module, and a wired communication module such as a local area network (LAN) communication module or a power line communication module. The above-described various types of communication modules 2253 may be implemented as a single chip or may be implemented as separate chips.

The input module 2230, the sensor module 2241, the camera module 2251, or the like may be used to control an operation of the display device DD in conjunction with the host 140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UPI) link to exchange a signal (for example, a command or data) with each other. The host 140 may communicate with the display device DD through a mutually agreed interface, for example, may use one of the above-described communication methods, and is not limited to the above-described communication method.

According to embodiments of the disclosure, a display device in which a space in a circuit board is efficiently provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel including a display area and a non-display area around the display area, wherein the display panel includes a display surface on which an image from the display area is displayed, and a rear surface opposite to the display surface; and
a circuit board connected to the display panel,
wherein the display panel further includes a first portion extending from the non-display area and bent, and a second portion extending from the first portion in a first direction to face the rear surface of the display panel, protruding from the first portion in the first direction, and connected to the circuit board,
the first portion of the display panel has a first width in a second direction crossing the first direction, and
the second portion of the display panel has a second width less than the first width in the second direction.

2. The display device according to claim 1, wherein the display surface has a third width greater than the first width in the second direction.

3. The display device according to claim 1, wherein the circuit board is fixed to the second portion of the display panel.

4. The display device according to claim 1, wherein the circuit board is a flexible circuit board.

5. The display device according to claim 1, further comprising:
a driver integrated circuit disposed on the second portion of the display panel and electrically connected to the display panel through lines of the display panel.

6. The display device according to claim 1, wherein the circuit board includes a first area disposed adjacent to the second portion of the display panel in the second direction or a direction opposite to the second direction.

7. The display device according to claim 6, wherein the first portion of the display panel has a first edge adjacent to the first area and extending in the second direction, and
the second portion of the display panel has a second edge adjacent to the first area and extending in the first direction.

8. The display device according to claim 7, wherein the first area is adjacent to the first and second edges.

9. The display device according to claim 6, further comprising:
a driver integrated circuit disposed on the second portion of the display panel, wherein the driver integrated circuit controls the display panel; and
circuit elements disposed on the first area of the circuit board and electrically connected to the driver integrated circuit.

10. The display device according to claim 6, further comprising:

a touch array disposed on the display panel;

a driver integrated circuit disposed on the second portion of the display panel, wherein the driver integrated circuit controls the display panel; and a touch driving circuit disposed on the first area of the circuit board, wherein the touch driving circuit controls the touch array.

11. The display device according to claim 10, wherein the display panel comprises:

a substrate;

a pixel circuit layer disposed on the substrate, wherein the pixel circuit layer includes a transistor;

a display element layer including a light emitting element electrically connected to the transistor; and a thin film encapsulation layer disposed on the display element layer, and the touch array is disposed on the thin film encapsulation layer.

12. The display device according to claim 6, wherein the circuit board further includes a second area disposed adjacent to the second portion of the display panel in the first direction.

13. The display device according to claim 12, wherein an area of the first area is less than an area of the second area.

14. The display device according to claim 12, further comprising:

a driver integrated circuit disposed on the second portion of the display panel, wherein the driver integrated circuit controls the display panel; and circuit elements disposed on the first area of the circuit board and electrically connected to the driver integrated circuit, wherein at least one selected from a battery, a sensor module, an antenna module, and a sound output module is disposed on the second area of the circuit board.

15. The display device according to claim 12, further comprising:

a touch array disposed on the display panel;

a driver integrated circuit disposed on the second portion of the display panel, wherein the driver integrated circuit controls the display panel; and a touch driving circuit disposed on the first area of the circuit board, wherein the touch driving circuit controls the touch array, wherein at least one selected from a battery, a sensor module, an antenna module, and a sound output module is disposed on the second area of the circuit board.

16. The display device according to claim 1, wherein the display area and the non-display area include a first unfoldable area, a foldable area, and a second unfoldable area sequentially disposed in a direction opposite to the first direction, and the foldable area is foldable based on a folding axis extending along the second direction.

17. The display device according to claim 16, wherein the first portion of the display panel extends from an area adjacent to the second unfoldable area of the non-display area of the display panel, and the circuit board overlaps the second unfoldable area.

* * * * *